(12) United States Patent
Bishop et al.

(10) Patent No.: US 8,362,946 B2
(45) Date of Patent: Jan. 29, 2013

(54) MILLIMETER WAVE SURFACE IMAGING RADAR SYSTEM

(75) Inventors: Grant Bishop, Carlsbad, CA (US); John A. Lovberg, San Diego, CA (US); Vladimir Kolinko, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 319 days.

(21) Appl. No.: 12/806,488

(22) Filed: Aug. 13, 2010

(65) Prior Publication Data

US 2011/0199254 A1 Aug. 18, 2011

Related U.S. Application Data

(63) Continuation-in-part of application No. 12/286,981, filed on Oct. 3, 2008, now Pat. No. 7,782,251.

(51) Int. Cl.
*G01S 13/89* (2006.01)

(52) U.S. Cl. ............. 342/179; 342/27; 342/58; 342/180

(58) Field of Classification Search .................... 342/27, 342/57–58, 74–75, 81, 90, 100, 103, 179–180
See application file for complete search history.

(56) References Cited

U.S. PATENT DOCUMENTS

| | | | | |
|---|---|---|---|---|
| 5,592,170 A * | 1/1997 | Price et al. | ........................ | 342/22 |
| 7,724,180 B2 * | 5/2010 | Yonak et al. | ..................... | 342/70 |
| 7,782,251 B2 * | 8/2010 | Bishop et al. | ................... | 342/179 |
| 2005/0134440 A1 * | 6/2005 | Breed | ............................ | 340/435 |
| 2008/0272955 A1 * | 11/2008 | Yonak et al. | ...................... | 342/54 |
| 2009/0135051 A1 * | 5/2009 | Bishop et al. | ................... | 342/175 |
| 2011/0199254 A1 * | 8/2011 | Bishop et al. | ................... | 342/179 |

* cited by examiner

*Primary Examiner* — John B Sotomayor
(74) *Attorney, Agent, or Firm* — John R. Ross

(57) ABSTRACT

A short range millimeter wave surface imaging radar system. The system includes electronics adapted to produce millimeter wave radiation scanned over a frequency range of a few gigahertz. The scanned millimeter wave radiation is broadcast through a frequency scanned transmit antenna to produce a narrow transmit beam in a first scanned direction (such as the vertical direction) corresponding to the scanned millimeter wave frequencies. The transmit antenna is scanned to transmit beam in a second direction perpendicular to the first scanned direction (such as the horizontal or the azimuthal direction) so as to define a two-dimensional field of view. Reflected millimeter wave radiation is collected in a receive frequency scanned antenna co-located (or approximately co-located) with the transmit antenna and adapted to produce a narrow receive beam approximately co-directed in the same directions as the transmitted beam in approximately the same field of view. Computer processor equipment compares the intensity of the receive millimeter radar signals for a pre-determined set of ranges and known directions of the transmit and receive beams as a function of time to produce a radar image of at least a desired portion of the field of view. In preferred embodiment the invention is mounted on a truck and adapted as a FOD finder system to detect and locate FOD on airport surfaces.

15 Claims, 16 Drawing Sheets

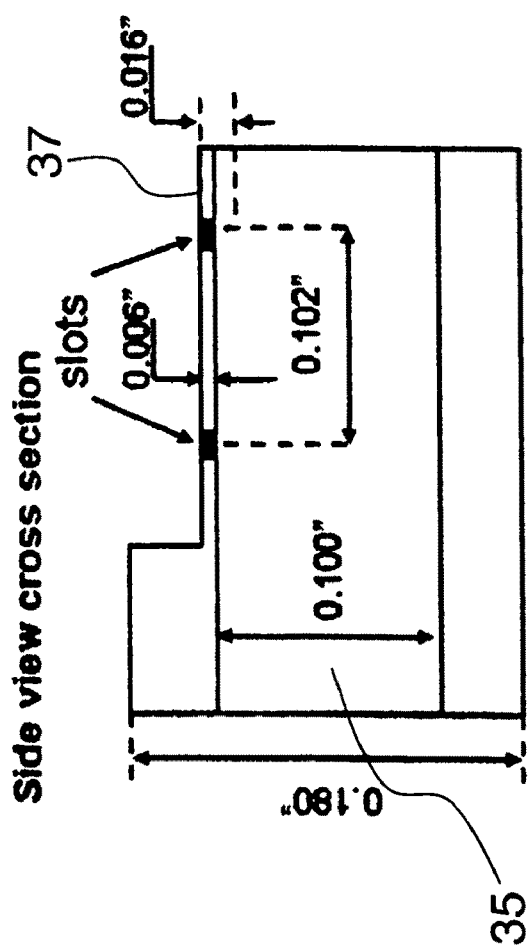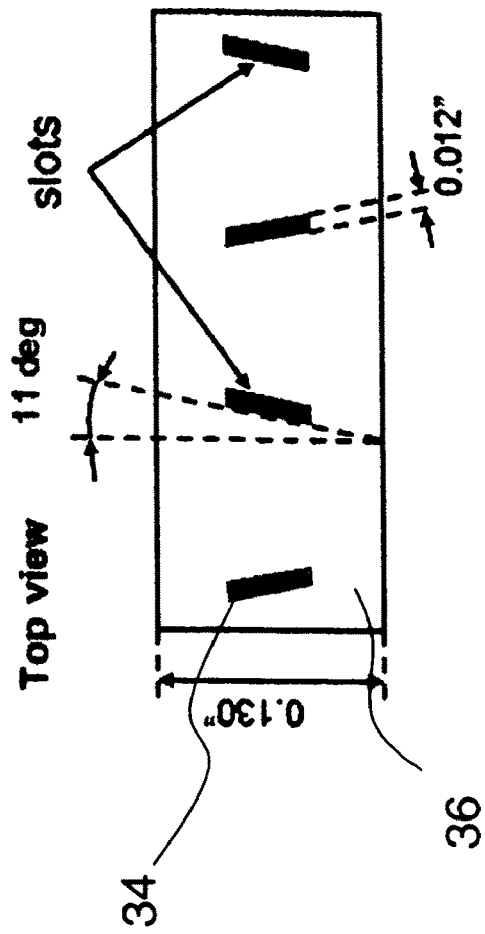

MILLIMETER WAVE SURFACE IMAGING RADAR SYSTEM

CROSS REFERENCE TO RELATED APPLICATIONS

This application is a continuation-in-part of Ser. No. 12/286,981, filed Oct. 3, 2008 U.S. Pat. No. 7,782,251, Mobile Millimeter Wave Imaging System.

FIELD OF THE INVENTION

The present invention relates to radar systems and in particular to millimeter wave imaging radar systems.

BACKGROUND OF THE INVENTION

Imaging with Millimeter Waves

Passive and active imaging systems operating at millimeter wavelengths (1 cm to 1 mm; 30 GHz to 300 GHz) are well known. Short wave length at mm-wave frequencies allows narrow beams to be created with relative small antennas and to produce high resolution passive and active images. Objects in the image can be accurately located due to the narrow beams and, when the systems operate in the radar mode, a high sensitivity for reflected signals can be achieved. An important quality of millimeter wave systems is that they are relatively little attenuated by substantial distances of fog or smoke compared to visible light. Radiation at these millimeter wave wavelengths penetrates substantial distances of fog and smoke. The millimeter wave radiation also penetrates clothing and significant thickness of other materials such as dry wood and wallboard. These millimeter wave imaging systems have therefore been proposed for aircraft to improve visibility through fog and for security applications for detection of concealed weapons and the like.

Passive Millimeter Wave Imaging

Passive millimeter wave imaging systems are described in U.S. Pat. Nos. 5,121,124 and 5,365,237, which are assigned to Applicant's employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced. Other frequency scanned passive millimeter wave imaging systems are described in U.S. Pat. Nos. 7,194,236 and 6,937,182. All of the above identified patents are hereby incorporated by reference.

Radar Systems

Radar systems operating at millimeter frequencies also are known. These systems typically modulate a millimeter wave signal with a two or more lower frequency signals (called frequency shift keying or FSK) or with a linearly changing (ramping up or ramping down in frequency) lower frequency signals (called linear frequency modulated LFM). And combinations of FSK and LFM have been proposed. These FSK and LFM systems have been proposed for autonomous motor vehicle control and motor vehicle collision avoidance. Some of the systems provide techniques for angular scanning of either the transmit beam or the receive beam or both.

Foreign Object Detection

Foreign object debris on the airport runway and other surfaces (often referred to as FOD) represents a significant hazard for safety of the air traffic. Objects that fall off the aircraft, equipment on the ground or misplaced by the ground services are responsible for large business losses by the commercial airlines, airports and the military and, in extreme cases, can result in a loss of human life. FOD costs the aerospace industry $4 billion per year and causes expensive, significant damage every year to aircraft and parts and may cause death and injury to workers, pilots and passengers.

Attempts to introduce radar systems at the airports for FOD detection are also known. High cost, complexity of operation, heavy infrastructure and experimental nature of such systems have been limiting their acceptance by the air transportation industry. A millimeter wave radar system designed and manufactured by a UK based company QinetiQ marketed under the name Tarsier is an example of an advanced mm-wave FOD detection system. A Tarsier system is presently in operation at Vancouver International Airport in Canada. The Tarsier radar was designed as a stationary, long range (up to 2 kilometers), frequency modulated radar to detect FOD along the entire length of the airport surfaces. This system is described in U.S. Pat. No. 7,592,943 which is incorporated herein by reference. The system utilizes frequency modulated continuous wave radar having improved frequency linearity of a voltage controlled oscillator (VCO) frequency sweep. It utilizes a frequency discriminator system to correct for non-linearity of the VCO. The discriminator signal is then used to adjust the signal sampling rate using an analog to digital converter. Long range of operation of the Tarsier system requires high precision mechanical and electronic components as well as high transmit power. These requirements result in a high cost for the system. In order to be able to detect FOD at long ranges the radar was designed to have very high sensitivity which reportedly caused significant amount of false alarms from signal clutter at shorter ranges.

According to the National Aerospace Standard 412 maintained by the National Association of FOD Prevention Inc., FOD is generally defined as a substance, debris or article alien to a vehicle or system which would potentially cause damage to the vehicle or system. Foreign object damage is any damage attributed to a foreign object that can be expressed in physical or economic terms that may or may not degrade the product's required safety and/or performance characteristics. Typically, FOD is an aviation term used to describe debris on or around an aircraft or damage done to an aircraft. Optical FOD detection systems operating with visible light are described in the Patents Nos. WO/2004/038675 and US20020080046 which are also incorporated herein by reference. Stationary millimeter wave radar systems, such as the Tarsier, may prove effective on sections of the airfield that have clear straight line of sight What is needed is a mobile millimeter wave imaging system.

SUMMARY OF THE INVENTION

The present invention describes a short range millimeter wave imaging radar system. The system may be operated as a stationary system to continuously or periodically monitor a particular surface region or it may be mounted on a vehicle for mobile operation. Preferred embodiments are mounted on a vehicle and is designed to detect objects in or near the path of the vehicle. The system includes electronics adapted to produce millimeter wave radiation scanned over a frequency range of a few gigahertz. The scanned millimeter wave radiation is broadcast through a frequency scanned transmit antenna to produce a narrow scanned transmit beam in a first scanned direction (such as the vertical direction) defining a narrow, approximately one dimensional, electronically scanned field of view corresponding to the scanned millimeter wave frequencies. The transmit antenna is mechanically pivoted or scanned in a second scanned direction perpendicular to the first scanned direction (such as the horizontal or the azimuthal direction) so as to define a two-dimensional field of view. Reflected millimeter wave radiation is collected by a receive frequency scanned antenna co-located (or approximately co-located) with the transmit antenna and adapted to produce a narrow receive beam approximately co-directed in the same directions as the transmitted beam in approximately the same field of view. Computer processor equipment compares the intensity of the receive millimeter radar signals for a pre-determined set of ranges and known directions of the transmit and receive beams as a function of time to produce a radar image of at least a desired portion of the field of view.

In preferred embodiment the invention is a FOD finder system adapted to detect and locate FOD on airport surfaces. In one preferred embodiment the radar system is mounted on top the cab of a pickup truck. The radar system operates in the millimeter wave frequency range between 78 to 81 GHz. The two frequency scanned antennas systems include an 8-inch slotted frequency scanned antenna with an elliptical cylindrical reflector adapted to produce a beam narrow in the vertical direction and frequency scanned in the vertical direction over a scanning range of about 4 degrees. In each of the two antenna systems the slotted frequency scanned antenna is located at the near focus of an elliptical cylinder reflector. The other focus of the elliptical reflector is at about 150 feet from the near focus. Both antennas define beams about half of a meter wide in the azimuthal direction out to about 150 feet and diverging at about 0.34 degrees further out in the azimuth direction and diverging at about 0.85 degrees in the vertical direction. The two antenna systems are pivoted together to define a radar field of view of about 4 degrees in the vertical direction and about 80 degrees in the azimuthal direction. The two antennas are generally directed at a downward angle from the top of the truck to produce a field of view on the airport surface about 20 meters to 200 meters ahead of the truck and 80 degrees in azimuth.

In the preferred embodiment the scanning frequencies are produced from a 12.25 GHz signal from a phase locked oscillator that is converted to 36.75 GHz with a frequency tripler which is then doubled to 73.5 GHz with a harmonic mixer. A voltage controlled oscillator provides a scanned 4.5 GHz to 7.5 GHz signal which is mixed in a harmonic mixer with the 73.5 GHz signal to provide a scanned millimeter wave signal between 78 GHz and 81 GHz which is then fed to the transmit antenna to produce the frequency scanned transmit beam.

The receive beam is similar to that of the transmit beam and is co-aligned with the transmit beam at any given time to maximize the return signals reflected by the objects. The received signal is down converted to low frequencies, digitized and has its frequency spectrum generated using a digital Fast Fourier Transform (FFT) processor. The transmitter and receiver beams are electronically scanned in the vertical directions and mechanically in the azimuthal direction. A computer creates two-dimensional images (EL angle and range) based on the vertical scanning direction of the beams and combines them into a three dimensional image based on horizontal scans. In the preferred embodiment of the FOD finder the distance to the FOD is determined based on the radar signal and azimuthal position is determined based on the horizontal scan information recorded by the system's computer processor. Radar energy is mostly reflected in the forward direction from the flat airport surfaces and not collected by the receive antenna. However, FOD on the flat hard surface produces a large back-scattered return signal as the beam sweeps on the airport surface. Distance to the targets is determined based on a difference in frequency of the transmit signal and the receive signal delayed by a roundtrip time of the millimeter waves reflected from FOD targets. The location of FOD on a runway is displayed on a monitor to represent a map of the FOD locations on the runway.

This preferred embodiment includes an integrated hardware/software system with external and internal visible light image recording in addition to the radar imaging equipment. The system also includes Internet database reporting via wireless transmission (or other) and the entire system is mobile and integrated to find FOD on airport surfaces.

The overall system is mounted on a mobile platform, such as a truck, and includes a GPS position tracking system, inertial navigation unit, automatically controlled video camera for visual object identification and computerized object logging and labeling system.

In preferred embodiments a field-programmable gate array and a digital-to-analog converter board are programmed to send out a drive voltage to a voltage controlled oscillator creating a fully programmable linear frequency ramp which drives the transmitter frequency. In other embodiments an analog ramp generator is programmed for slope and second and higher derivatives to create a desired voltage ramp signal. These components allow Applicants to adjust the sweep rate and range of sweep. The linear frequency ramp defines the range resolution for the radar system and also sweeps the antenna beam in elevation. Having this unique steering capability in two dimensions allows the radar to be vehicle-mounted and driven at high rates of speed in this instance on an airport runway while providing ample scan coverage for reliable and effective FOD detection.

BRIEF DESCRIPTION OF THE DRAWINGS

FIGS. 3D, 3F and 3G show details of the frequency scanned slotted waveguide antenna.

DETAILED DESCRIPTION OF PREFERRED EMBODIMENTS

First Preferred Embodiment

The preferred embodiment of the present invention is described in FIGS. 1 through 9. This embodiment is a three dimensional W-band Frequency Modulated Continuous Wave (FMCW) active imaging radar system. The system is capable of accurately determining the bearing and range to foreign objects on the airport surfaces and displaying this information to system operators. The system has up to 200 meters (600 feet) operation range and has to be driven around in order to detect FOD in larger areas.

The radar of the system consists of a millimeter wave transmitter, receiver, one each transmit and receive prime focus reflector antennas, receiver signal digitizer and FFT processor. The transmit antenna and the receive antenna have similar configurations. They form narrow co-aligned/overlapping beams which are 0.85 degree wide (spreading from several inches in the near field) in the vertical directions and 0.34 degree wide (spreading from about two feet in the near field) in the horizontal direction. The system employs a linear frequency modulated chirp radio frequency waveform sweeping between 78 GHz and 81 GHz in 7 milliseconds. The azimuthal resolution is about one meter and the range resolution is about 20 cm.

Capabilities

The system provides the following capabilities:
1. Operational range: 20 m to 200 meters.
2. Hazard detection range: minimum 200 meters for a ½-inch ball bearing target.
3. Field of view: 80 degree horizontally (in azimuth) and 4 degree vertically (in elevation). The longitudinal field of view is from about 20 meters to 200 meters in front of the truck.
4. Range resolution: 20 cm.
5. Transmitter frequency: linear modulated (chirped) between 78 and 81 GHz.
6. Transmitter power: 20 milliwatts.
7. Antenna polarization (transmit and receive): vertical.
8. One full image acquisition time (horizontal scan): 1.5 second.

Imaging Radar System

Frequency Scanned Radar

Figure 1:
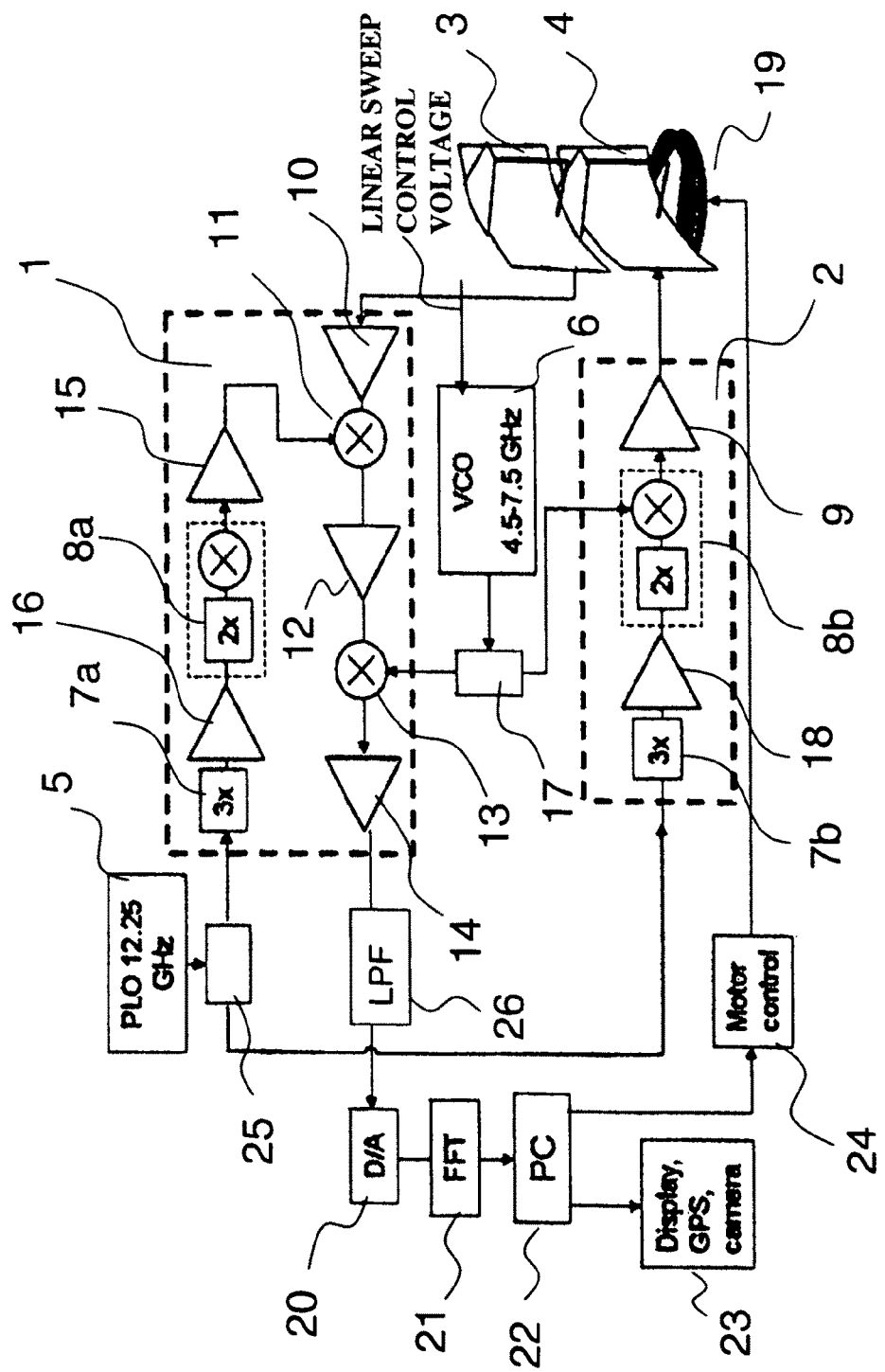
FIG. 1 is a block diagram of the foreign object detection radar including transmitter, receiver, antennas and signal processing components.
Figure 2A:
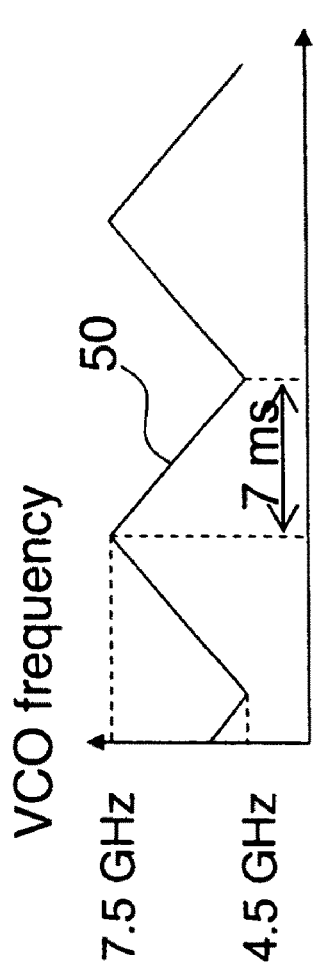
FIGS. 2A and 2B show time diagrams of the frequency swept transmit signal and readout of the received signal.
Figure 2B:
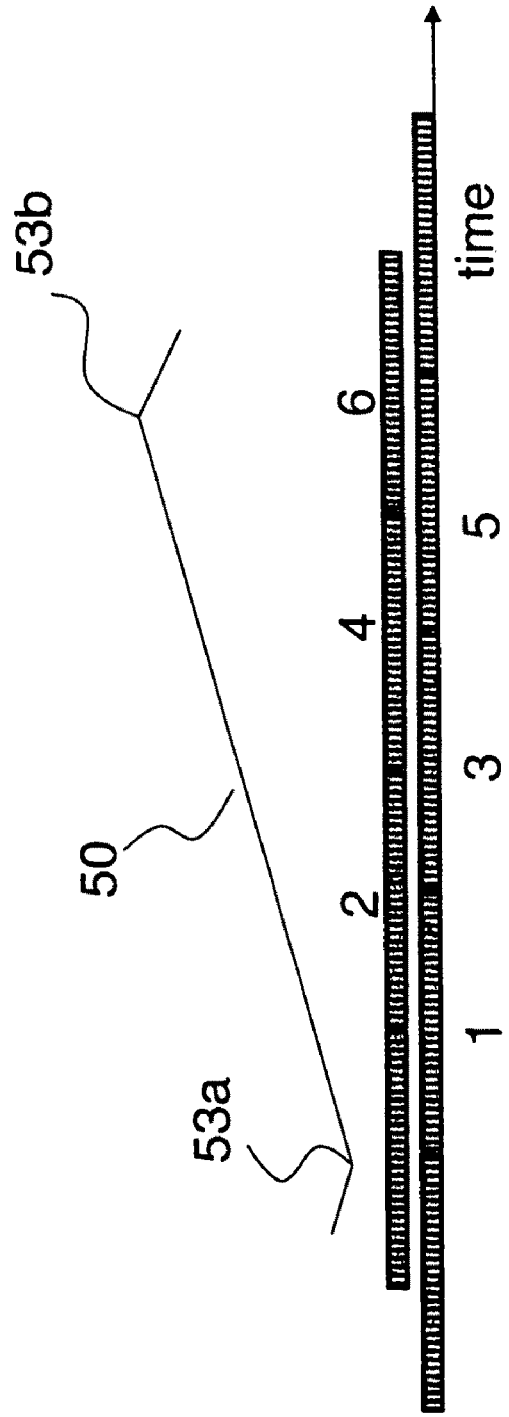

A block diagram of an imaging radar system of a preferred embodiment of the present invention is shown in FIG. 1. In preferred embodiments a transmitter module 2 generates a continuous wave millimeter wave signal that is linearly swept back and forth between 78 and 81 GHz in 7 milliseconds using an alternating up-down see-saw frequency sweep pattern 50 as shown in FIG. 2A. In other embodiments a modified sawtooth waveform using only a single scanning direction as shown in FIG. 2B and a fast retrace period is used.

Figure 3B:
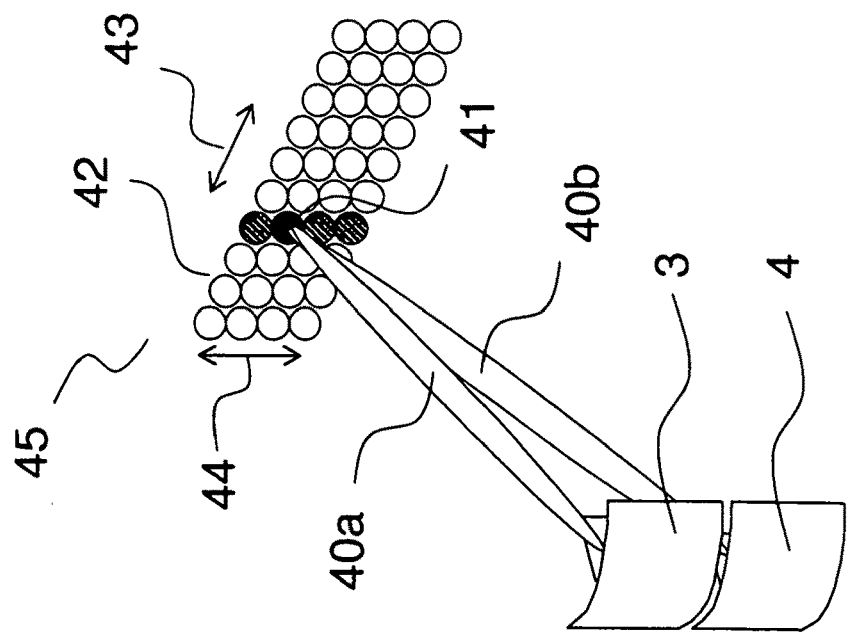
FIG. 3B illustrates a principle of a multi pixel image formation in the radar.
Figure 3A:
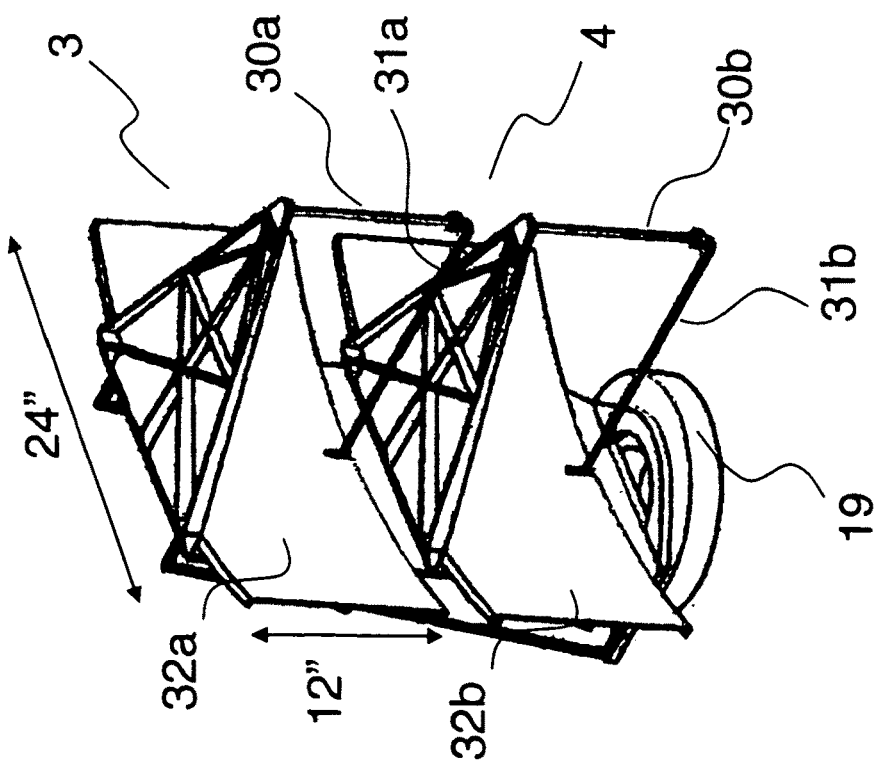
FIG. 3A shows transmit and receive antennas.
Figure 3C:
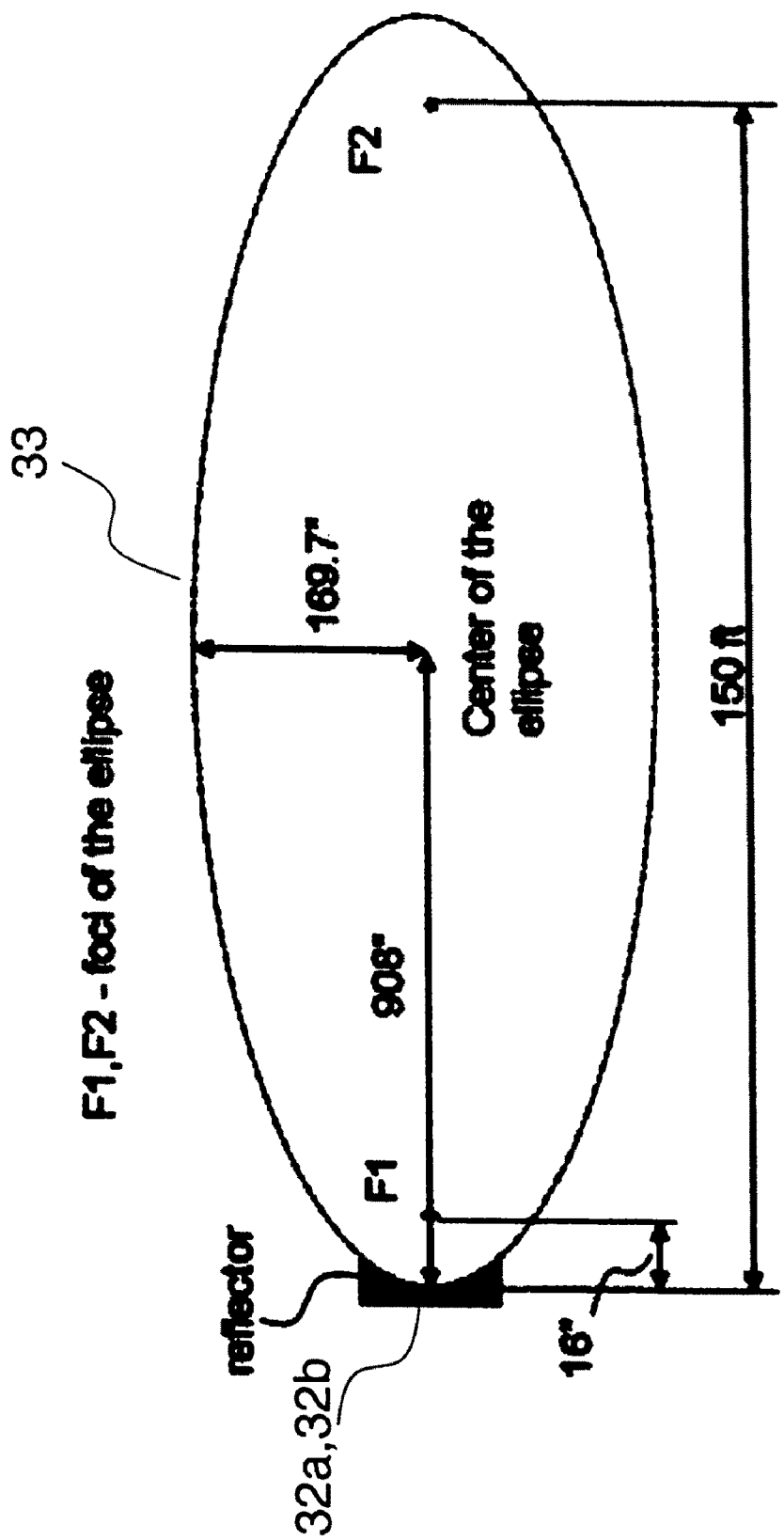
FIG. 3C shows details of the antenna reflector design.
Figure 3D:
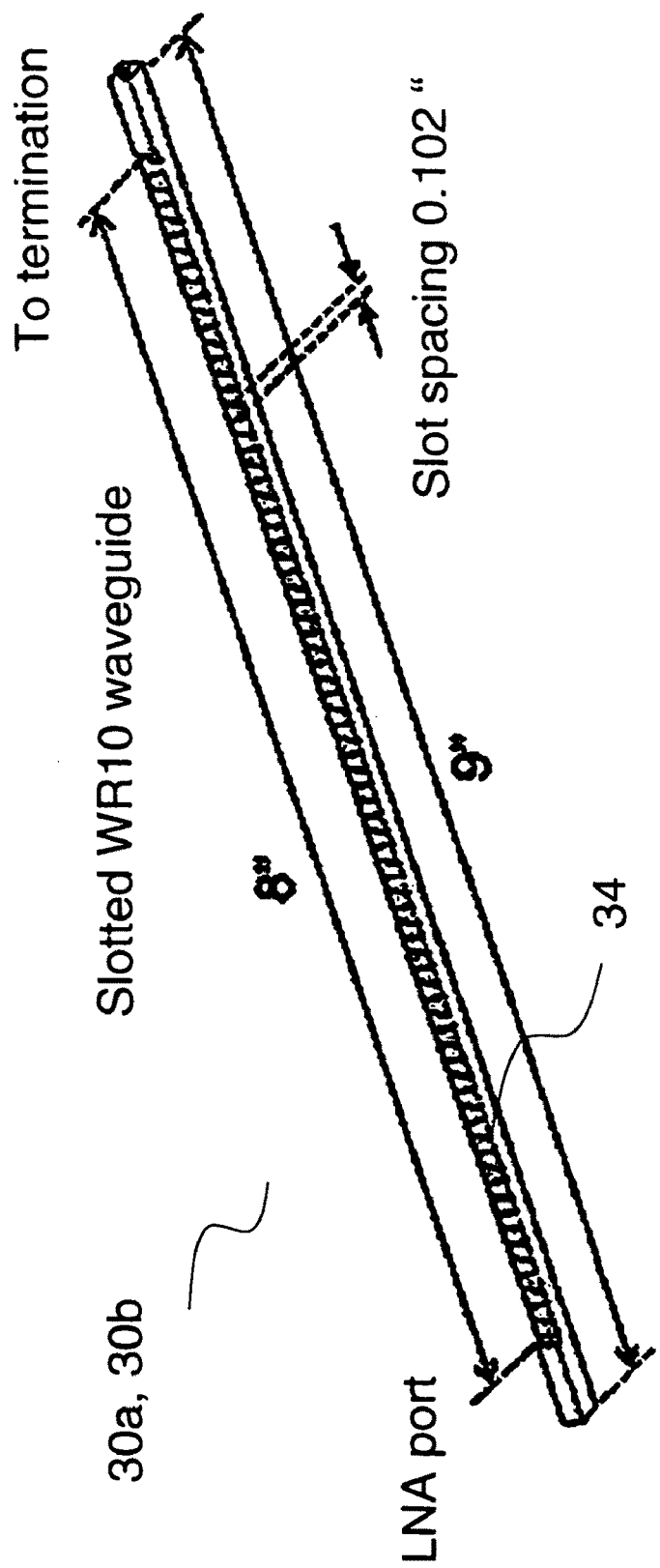
Figures 3E, 3H:
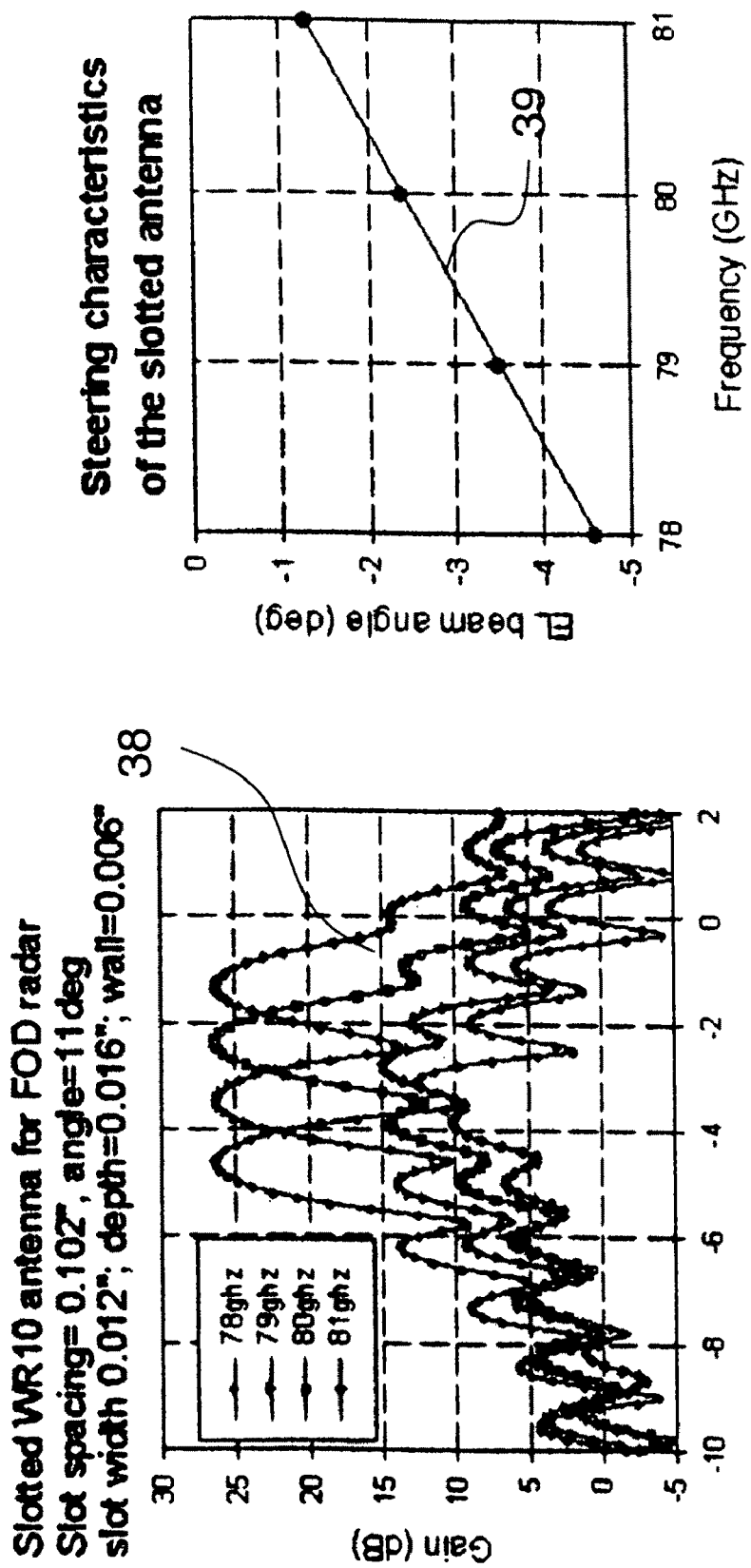
FIGS. 3E and 3H show plots of the antenna beam patterns in the 78-81 GHz frequency range.

The receive antenna unit 3 and the transmit antenna unit 4 utilize slotted wave guide antenna elements 30*a* and 30*b* as shown in FIG. 3A positioned in the near focus of the receive antenna reflector 32*a* and the focus of transmit antenna reflector 32*b*. Each reflector is two feet wide and one foot high and has a shape of an elliptical cylinder 33 with the slotted wave guide located in the first focus F1 at a distance of 16 inches from the center of the reflector. The second focus F2 of the reflector is located 150 feet from its center as shown in FIG. 3C. Transmit and receive slotted antennas are made from standard WR-10 copper wave guides with slots 34 cut into their narrow wall 36 as shown in FIGS. 3D, 3F and 3G. (In an alternate design a custom waveguide of the same cross-section as standard WR-10 has been machined in a two-section (top/bottom) clamshell configuration, as shown in FIG. 3H, to allow very repeatable high-precision machining of the antenna coupling slots.) The slotted aperture of the antenna is 8 inches long and it is 0.13 inch wide as shown in FIG. 3D. Slots are spaced 0.102 of an inch apart and their angle alternates +−11 degrees as shown in FIG. 3G. A portion of the narrow wall 37 of the wave guide is thinned to 0.006 of an inch before slots are cut 0.015 inch deep into the wave guide relative to its outer surface 37. The length of the slotted wave guide antenna determines an angular resolution (beam width) of 0.85 degree of the radar in the vertical direction. Horizontal angular resolution (beam width) of 0.34 degree is determined by the 24 inches wide aperture of the reflector illuminated by the slotted wave guide. In the preferred embodiment a slotted waveguide frequency scanned antenna allows high angular resolution of the beams to be combined with a sufficiently wide vertical FOV of the radar. The use of an cylindrical elliptical reflector optimizes side-lobe level of the beam at different ranges. Beam side lobe level is also reduced by providing maximum mm-wave power near center of the reflector and gradually reducing illumination toward its edges. In this preferred embodiment electronic in the radar unit limits the out front field of view to a range of 20 meters to 200 meters.

As the millimeter wave signal frequency sweeps between 78 and 81 GHz the beam formed by the slotted antennas 30*a* and 30*b* changes its angle with respect to the normal to the long axis of the wave guide. The vertical angle of the beam formed by the entire antenna including reflectors varies also with frequency as the mm-waves radiated by the slotted wave guide bounce off the reflector surface. Vertical beam patterns 38 of the FOD radar at 78, 79, 80 and 81 GHz beam sweep characteristics vs frequency are shown in FIGS. 3E and 3H. Zero angle corresponds to the normal to antenna. Negative angles represent beam directions toward the ground when the normal is horizontal. The center of the beam angle vs frequency is shown in plot 39, hence the vertical field of view of the FOD is approximately 4 degrees. According to the data in FIG. 3E the antenna forms four resolved beams in the vertical direction for the frequency sweep between 78 and 81 GHz. Signal strength for each resolved beam is coded in the FOD radar image by a pixel brightness for a given target range. FIG. 3B illustrates a principle of image formation by the radar. The radar image plane 45 is represented by footprints of the antenna beams in the vertical 44 and horizontal directions 43. Each footprint 41 is a cross-section of overlapping transmit beam 40b and receive beam 40a. There are four resolved 0.85 degree beams in the approximately 3.4 degree vertical field of view and 235 resolved 0.34 degree beams in the 80 degrees wide horizontal FOV of the FOD radar which permits the generation of 4×235 pixel images at a fixed range. By using signals from half-resolved beams the image size can be increased to 8×470 pixels. The FOD radar is capable of generating images at 1024 ranges between 20 and 200 meters for an overall 3D image size up to 4×235×1024 pixels. Alternatively the elevation bins can be stacked and added to produce a two-dimensional range-angle image of 235×1024 pixels.

Radar Electronics

In this preferred embodiment frequency scanning is utilized for two purposes: first as explained above for scanning the transmit beam in the vertical direction as explained in the above section, and second to determine the distance to FOD targets. This is feasible because the frequency difference between the transmit and return signals to and from a target FOD is a linear function of the distance to the target. This relationship is explained in the section following this section. This section describes the electronic utilized in order to compare the transmit and receive signals so as to extract this frequency difference.

FIG. 1 is a diagram of the electronics of the preferred radar system. Transmitter 2 and receiver 1 of the FOD radar use a high-stability phase locked 12.25 GHz oscillator 5 (such as Model PLO-2000 supplied by Microwave Dynamics with offices in Tustin, Calif.) as a reference for generating mm-wave signals. The 12.25 GHz signal is initially converted to 36.75 GHz by a frequency tripler 7a (such as Model CHX 1094-99F supplied by United Monolithic Semiconductors with offices in Orsay, France) in receiver and 7b in transmitter and then converted to 73.5 GHz by a sub-harmonic mixer 8a in receiver and 8b in transmitter. In the process of frequency conversion the resulting signals are amplified to appropriate levels by amplifiers 15, 16 and 18 (such as Models HMC-APH510 and HMC-AUH318 supplied by Hittite Microwave Corp. with offices in Chelmsford, Mass.). A low phase noise voltage controlled oscillator 6 (such as Model HMC-C028 supplied by Hittite Microwave Corp. Chelmsford, Mass.) generates a linear frequency modulated signal spanning 3 GHz from 4.5 GHz to 7.5 GHz. A frequency modulated transmit signal between 78 GHz and 81 GHz is generated by mixing 73.5 GHz and the voltage controlled oscillator signal in a harmonic mixer 8b. The resulting signal is amplified by a power amplifier 9 (such as Models HMC-AUH320 or NMC-AUH317 supplied by Hittite Microwave Corp. with offices in Chelmsford, Mass.) to a power level of approximately 15-20 milliwatts and the amplified signal is transmitted from the transmit antenna 4. To ensure signal coherence and to achieve high range resolution, as indicated in FIG. 1, the same 12.25 GHz reference and a voltage controlled oscillator sources are employed as local oscillators for up-down conversion of transmit and receive signals by using two way in phase power dividers 25 and 17.

Figure 9A:
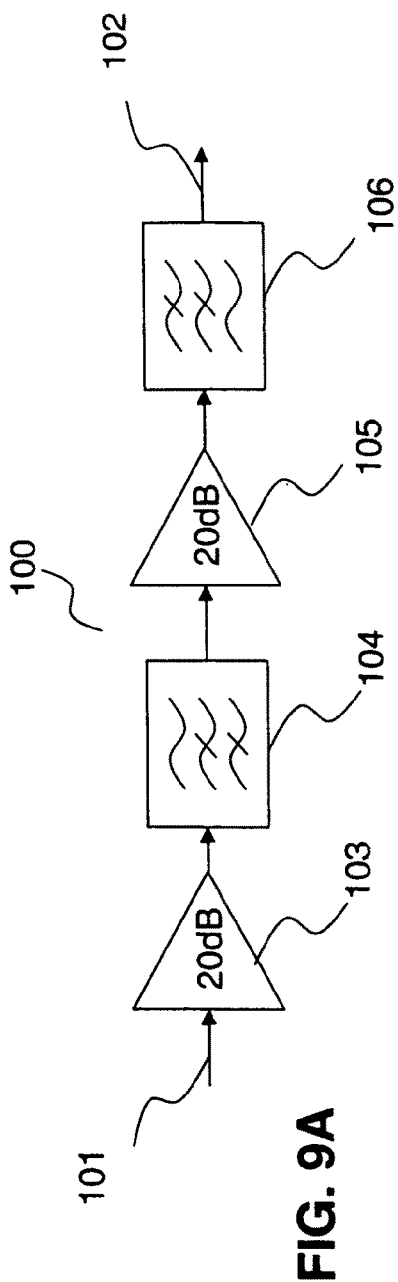
FIGS. 9A, 9B and 9C describe a baseband FOD receiver amplifier and its frequency response characteristics.
Figure 9C:
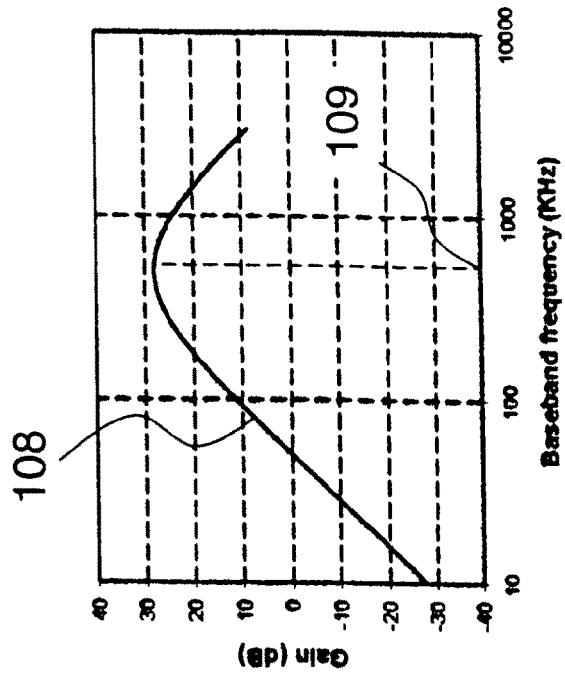
Figure 9B:
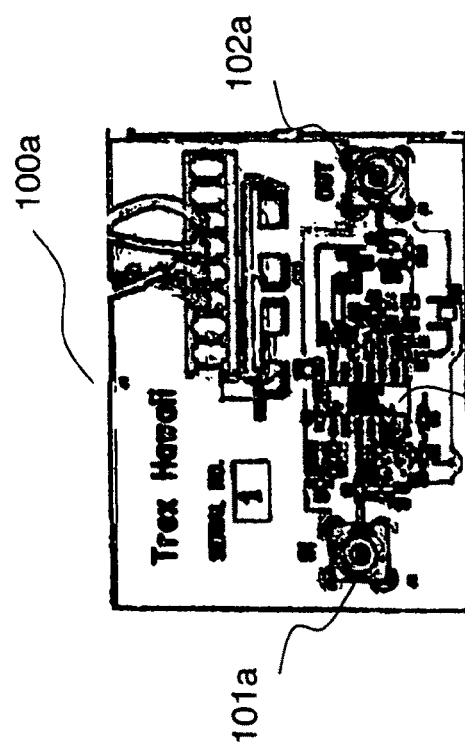
Figure 10:
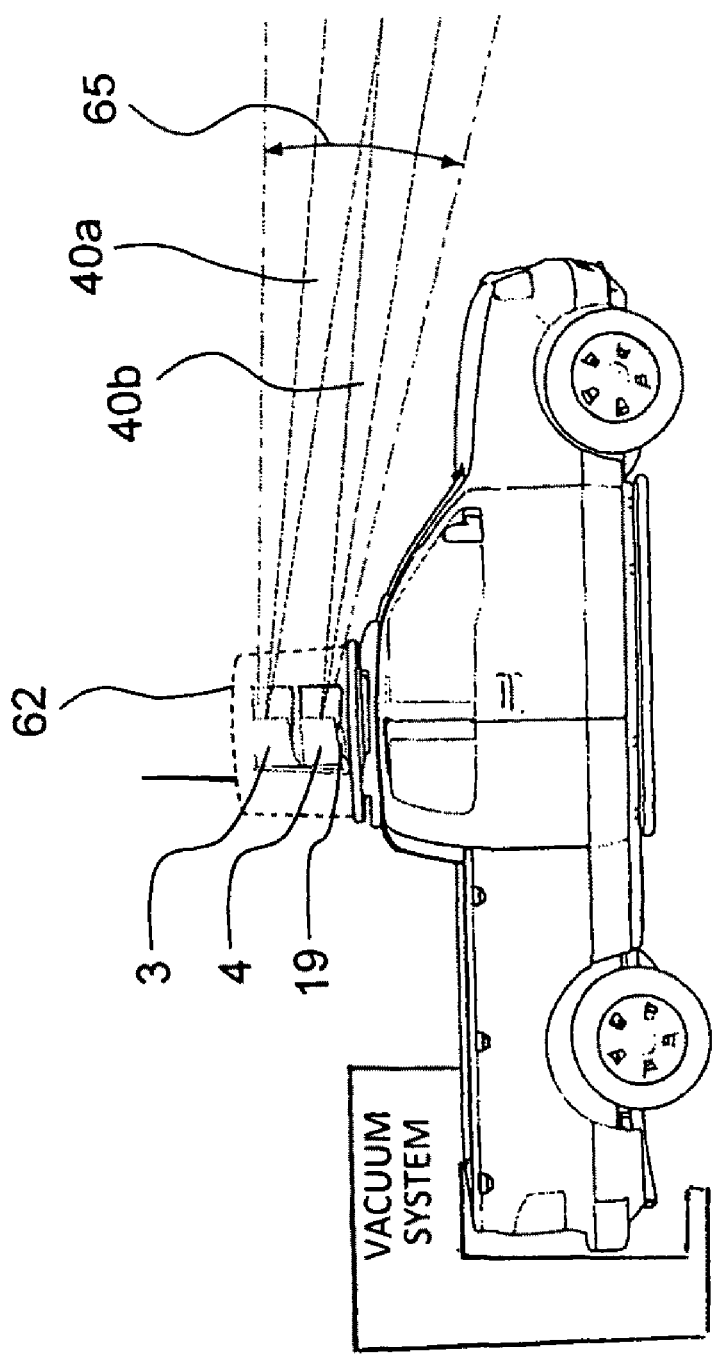
FIG. 10 is a drawing showing the addition of a scoop-vacuum system for collecting FOD.
Figure 11:
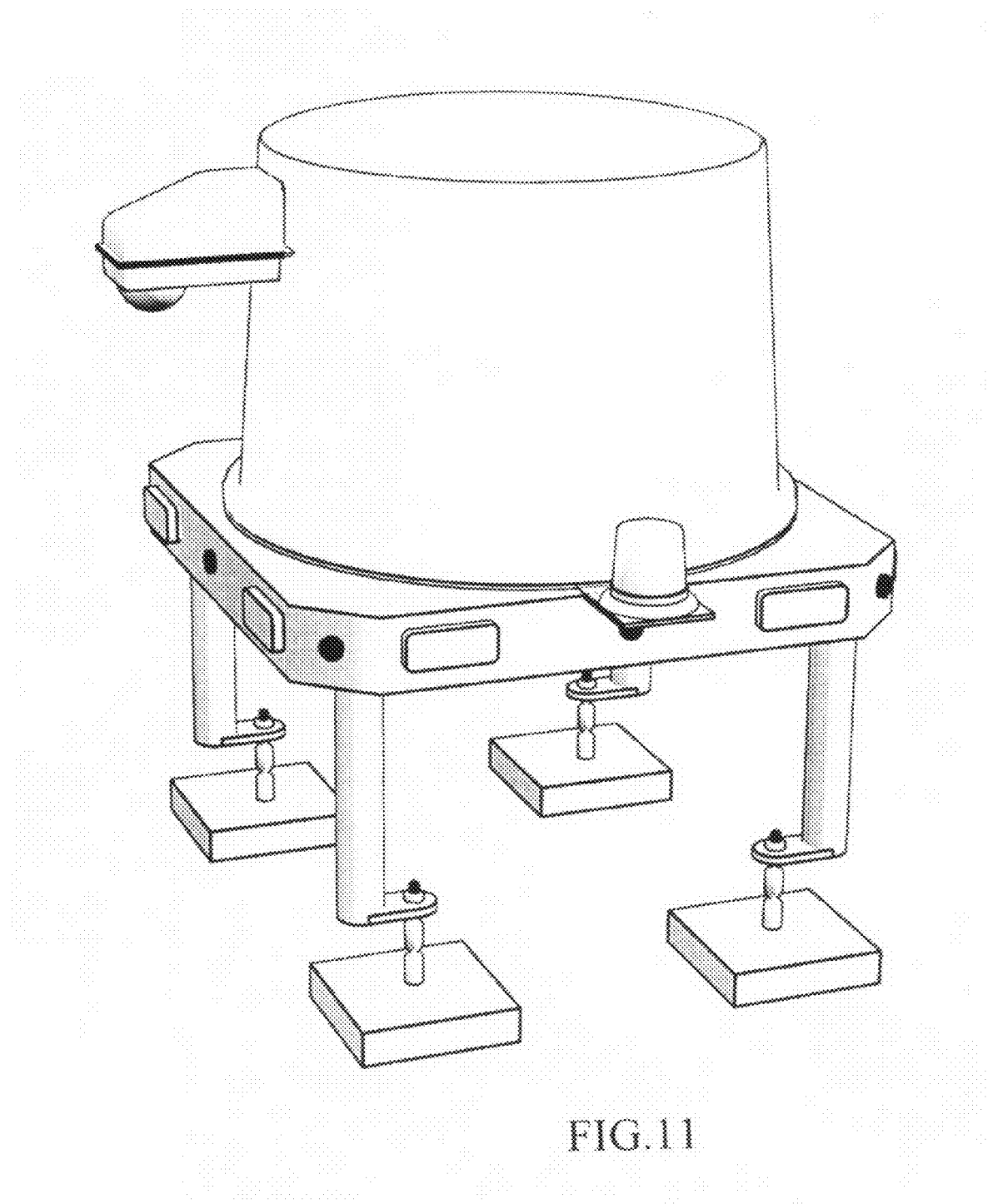
FIG. 11 is a drawing of a stationary system for continuous monitoring of specific locations.

The transmit signal reflected from the targets is collected by the receive antenna 3 and amplified by a low noise amplifier 10 (such as Model 86LN4D supplied by HRL Laboratories, LLC with offices in Malibu, Calif.). The amplifier has a typical gain of +20 dB and noise figure of 5 dB. The amplified signal is initially down converted by mixing it with 73.5 GHz local oscillator signal in a first mixer 11. The output signal of the mixer is amplified by a three stage 50 dB gain amplifier 12 (such as Model HMC396 supplied by Hittite Microwave Corp. with offices in Chelmsford, Mass.) followed by a down conversion to a base band DC-500 KHz frequency range using voltage controlled local oscillator 6 signal spanning the above 3 GHz from 4.5 GHz to 7.5 GHz for a second mixer 13 (Model HMC129 supplied by Hittite Microwave Corp. with offices in Chelmsford, Mass.). The output signal of the second mixer 13 is amplified by a specially designed base band amplifier 14 which brings signal to a level suitable for digitizing, removes signal level dependency on the range of the target and filters out signals that correspond to ranges shorter than 20 meters and longer than 200 meters. It is well known from the radar theory that the power of the return signal from a small target is inversely proportional to the fourth power of the target range. If the target range increases by a factor of two, the return signal power intercepted by the radar decreases 16 times or 12 dB. The base band amplifier of the FOD radar has 12 dB per octave gain slope 108 shown in FIG. 9C. The amplifier attenuates return signals by −30 dB or more for return frequencies below 10 KHz and corresponding ranges of 12 feet or less, whereas it amplifies signals by +30 dB at frequencies of 500 KHz as shown at 109 in FIG. 9C corresponding to maximum FOD radar range of 600 feet. The amplifier block diagram 100 and an actual circuit board 100a are shown in FIG. 9A and FIG. 9B. A base band signal from the $2^{nd}$ mixer 13 (FIG. 1) is connected to the input 101 of the amplifier and a signal from its output 102 is connected to an anti-aliasing filter 26 (such as model LE7640 with cutoff frequency of 550 KHz made by TTE Inc., Los Angeles, Calif.) and then to D/A converter 21 (FIG. 1). Signal input 101a and output 102a ports of the amplifier are also shown in FIG. 9B. The amplifier consists of a first 20 dB gain block 103, a second order active high pass filter 104, a second 20 dB gain block 105 and a second order active low pass filter 106. Both filters have 500 KHz cutoff frequencies, which, in combination with the gain blocks, provide a frequency response 108 shown on FIG. 9C. The entire circuit is realized using a four channel ultra low noise, high precision operational amplifier integrated circuit 107 (Model AD8674 supplied by Analog Devices Inc. with offices in Norwood, Mass.).

Distance Calculations

The frequency difference between the transmit and return signals is a linear function of the range to the target. The output signals between 0 and 500 KHz are used to determine the distance to the FOD objects. The signals are monitored to detect high intensity peaks exceeding a predetermined threshold indicating reflection from a FOD object located in the field of view of the radar. Distance to a FOD object is determined from the frequency of the measured peaks. In this embodiment the frequency range of the analyzed signals is 0 to 500 KHz. The sweep time is 7 milliseconds so the rate of change of frequency, $\Delta f/\Delta t$ is $4.286 \times 10^{11}$ Hz/s. The distance traveled by the millimeter wave beam at the speed of light c is twice the distance R to the target FOD object. So the distance R to the target can be determined by the following equation:

$$R = \frac{fc}{2\Delta f/\Delta t} = (0.35 \text{ m/kHz})f$$

Therefore a peak at a measured frequency f of 300 kHz would indicate a target at 105 meters.

Isolating Frequencies

Once signal strength of the radar is made independent of the range, it can be described as a sum of sinusoidal signals whose amplitudes are proportional to the radar cross section of targets and frequencies are proportional to their range. Applicants use Fast Fourier Transform (FFT) processing to determine the amplitude and frequency of the signals. As shown in FIG. 1, the output of the FOD receiver is digitized by an analog-to-digital converter 20 at a sampling frequency of 1 million samples per second and then processed into a Fourier power spectrum using a Field Programmable Gate Array chip in an FFT processor 21. Details of the FFT processor are described in the next section. Real time FFT power spectra each containing 1024 frequency components with the component magnitude resolution of 16 bit are communicated to a computer 22 where the data is converted into FOD images. Alternatively the digitized time signal has been passed directly to the computer CPU for numerical FFT processing and conversion to FOD images. A tablet computer 22 located in the cabin of the truck displays FOD images on a display 23 to a system operator and also controls a turntable 19 that performs 80 degrees horizontal sweeps of the radar antenna, tracks radar position using GPS/INU (described below) and satellite imaging, automatically controls Point-Tilt-Zoom camera (shown at 63 in FIG. 6) and displays its images, supports tools for FOD item labeling and logging.

Signal Digitizing and FFT Processing

Figure 4:
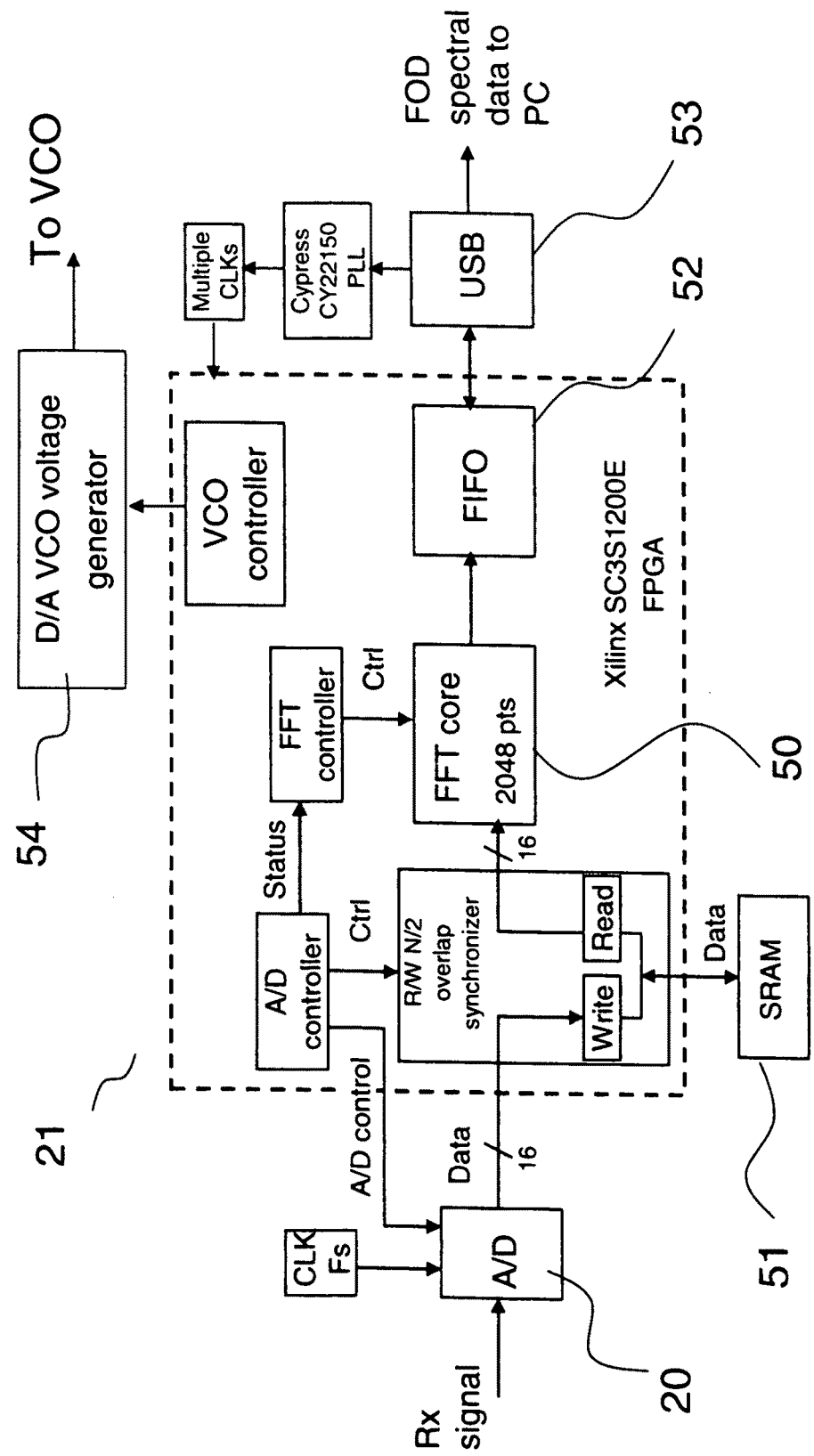
FIG. 4 is a block diagram of the receiver signal digitizer and fast Fourier transform processor in the field programmable gate array.
Figure 4A:
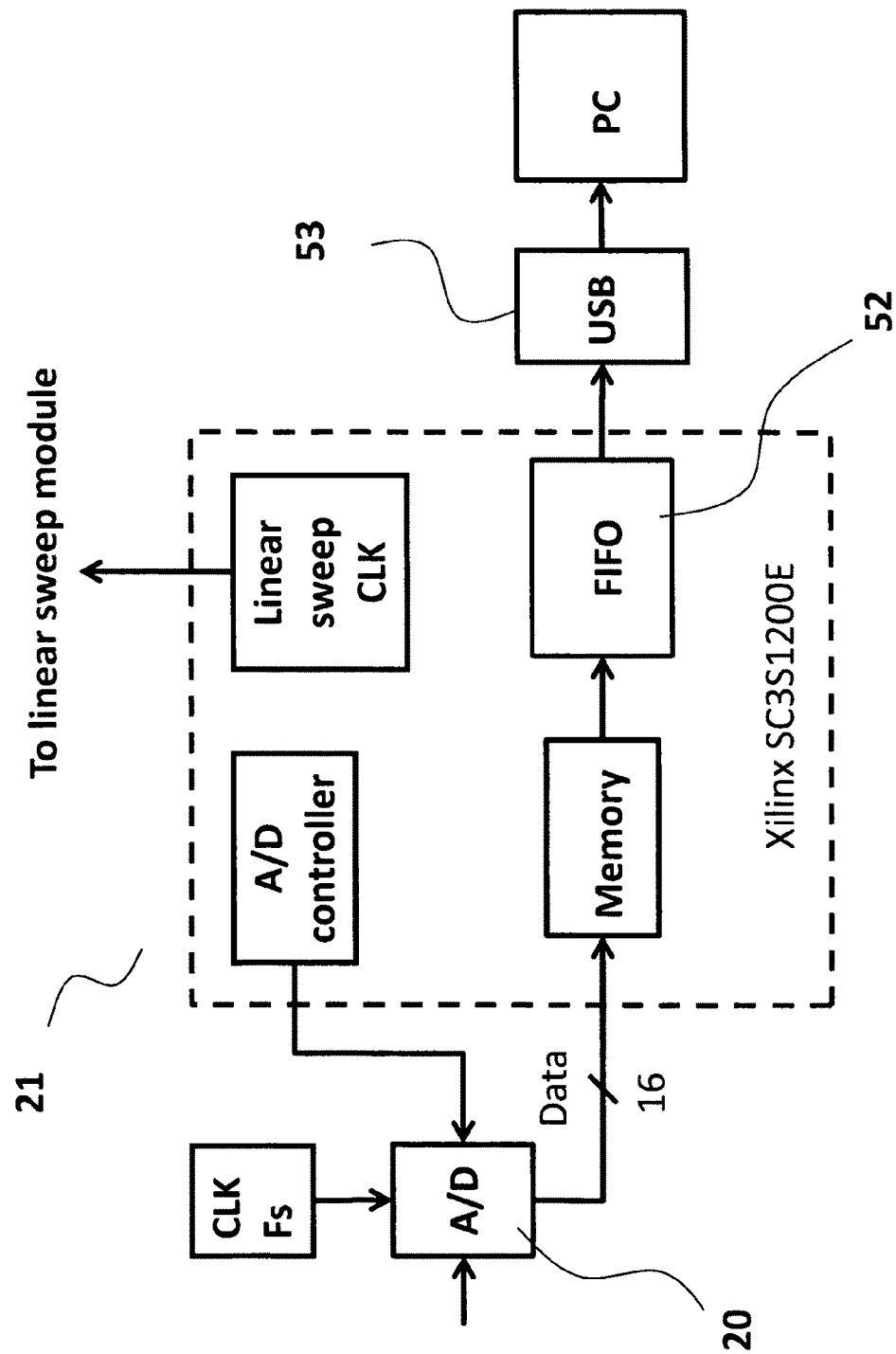
FIG. 4A is a block diagram of an alternative technique for analyzing the radar data.

FIG. 2B and FIG. 4 provide additional details of the FOD radar signal digitizing and FFT processing. As shown in FIG. 4, a single channel analog to digital converter 20 operates at a sampling rate of 1 million samples per second to digitize voltage in the range between −1 volt and +1 volt with 16 bit resolution. The signal is digitized continuously and buffered into a synchronous memory SRAM 51 before the data is fed into an FFT processor 21 or computer 22. The digitized data is grouped into 2048 consecutive data point samples suitable for the FFT. Each sample is multiplied by a Hamming window in FPGA before fast Fourier transform processing. The window reduces side-lobe level of the Fourier responses caused by finite length of the samples. Samples from SRAM 51 are read into the FFT processor at twice the sampling rate for continuous FFT processing of the samples with 50 percent overlap in time. Overlapping of samples prevents signal loss due to the widowing and in effect results in half resolved (vertical angle over sampling) beams as described above. Signal sampling is synchronized with the voltage controlled oscillator frequency sweeps. The first sample 1 begins at the start 53a of the linear frequency sweep S as illustrated in FIG. 2B. The next sample 2 overlaps sample 1 by 50 percent of its length. Sample 3 overlaps with the preceding sample 2 and so on, all as shown in FIG. 2B. A total of 6 signal samples are acquired per frequency sweep. Sample 6 that contains signals coinciding with the sweep reversal point 53b is discarded. In the case that an asymmetric sawtooth/retrace sweep is used, preferably seven samples are acquired and two are dropped to accommodate the non-zero retrace period.

Figure 5:
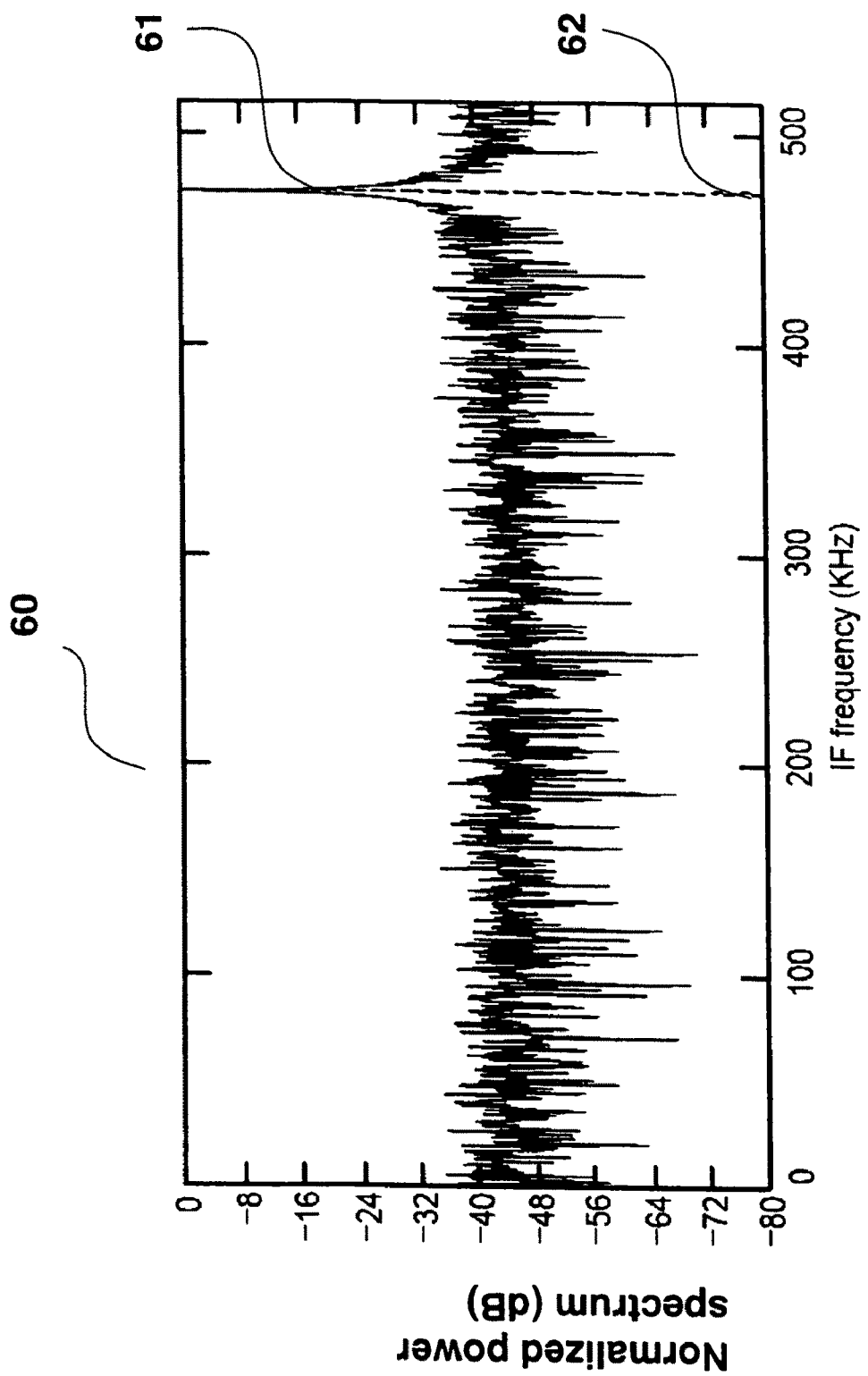
FIG. 5 shows a simulated FFT spectrum of the radar for a 0.5 inch diameter ball bearing at a 550 feet range.

The FFT spectra of the FOD radar signal samples are processed in an field programmable gate array based processor 21 which, in parallel with computing FFT spectra, also controls data streams for the A/D module 20, SRAM memory 21, linear frequency sweep D/A voltage generator for the VCO 6 and USB interface 53 to the computer. In this preferred embodiment a Xilinx SC3S1200E FPGA chip containing 1.2 million gates is used. (FPGA vendor Xilinx Inc. has offices in San Jose, Calif.). A USB interface to PC 22 is based on Cypress Semiconductor USB micro-controller chip CY68013A. (A larger FPGA would allow greater processor flexibility at a higher cost.) An FFT processor is created in the FPGA by programming into it an FFT core provided by Xilinx. An example of a computer simulated FFT power spectrum 60 from the FOD radar is shown in FIG. 5. A peak 61 at a base band frequency 62 in the spectrum represents a response from a 0.5 inch ball bearing FOD object at a 550 feet range. In other preferred embodiments the FFT power spectrum is computed numerically on the computer's CPU without use of the Xilinx FPGA.

Linear Frequency Sweep Generation in VCO

Field programmable gate array processor 21 synchronizes the radar signal readout and VCO frequency sweep by controlling output of voltage generator 54. Generator 54 contains a microprocessor that outputs digital voltage data stored in its memory to a digital to analog (D/A) converter based on Texas Instruments Inc. chip model DAC8811. The data output is triggered by an FPGA Sync signal. VCO oscillators typically have a nonlinear voltage vs frequency characteristic. The digital voltage data is adjusted to reduce this non linearity and ensure linear frequency sweep of the VCO with time. A stepwise output of the D/A converter is smoothed by a sixth order elliptical low pass filter before it is applied to the VCO sweep control port. In other preferred embodiments the sweep voltage is produced using an analog ramp generator with controllable slope, curvature and higher derivatives so as to eliminate the stepwise discontinuities characteristic of the digital ramp generator.

Mobile Platform of the FOD Finder

Figure 6B:
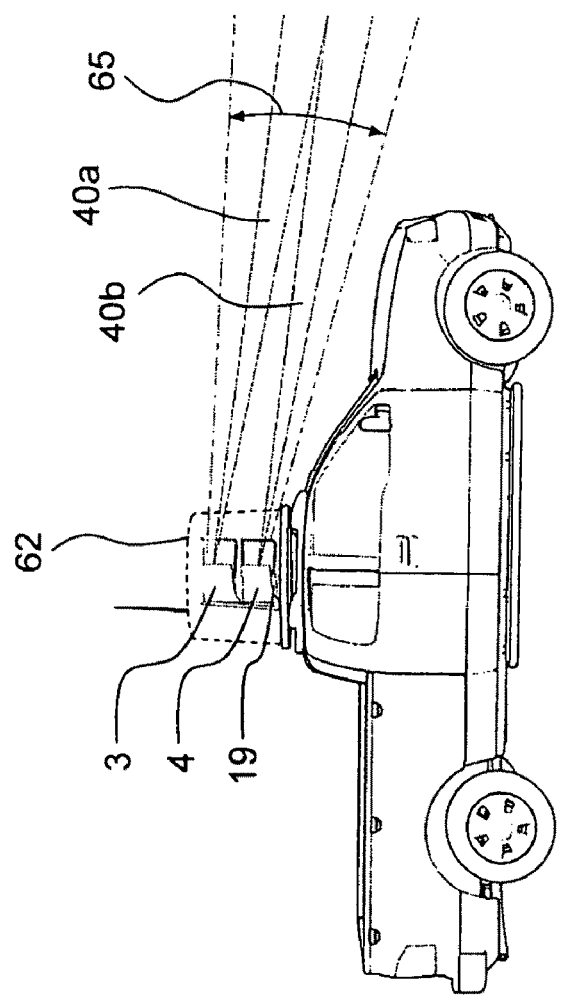
FIGS. 6A and 6B show a mobile FOD radar system on a truck.
Figure 6A:
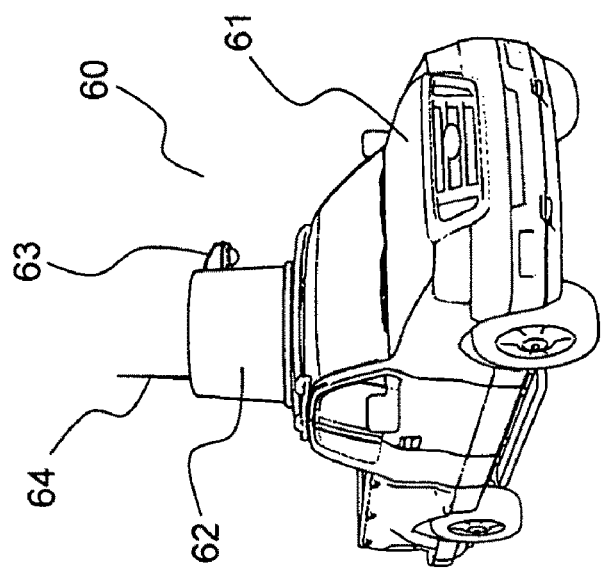
Figure 7:
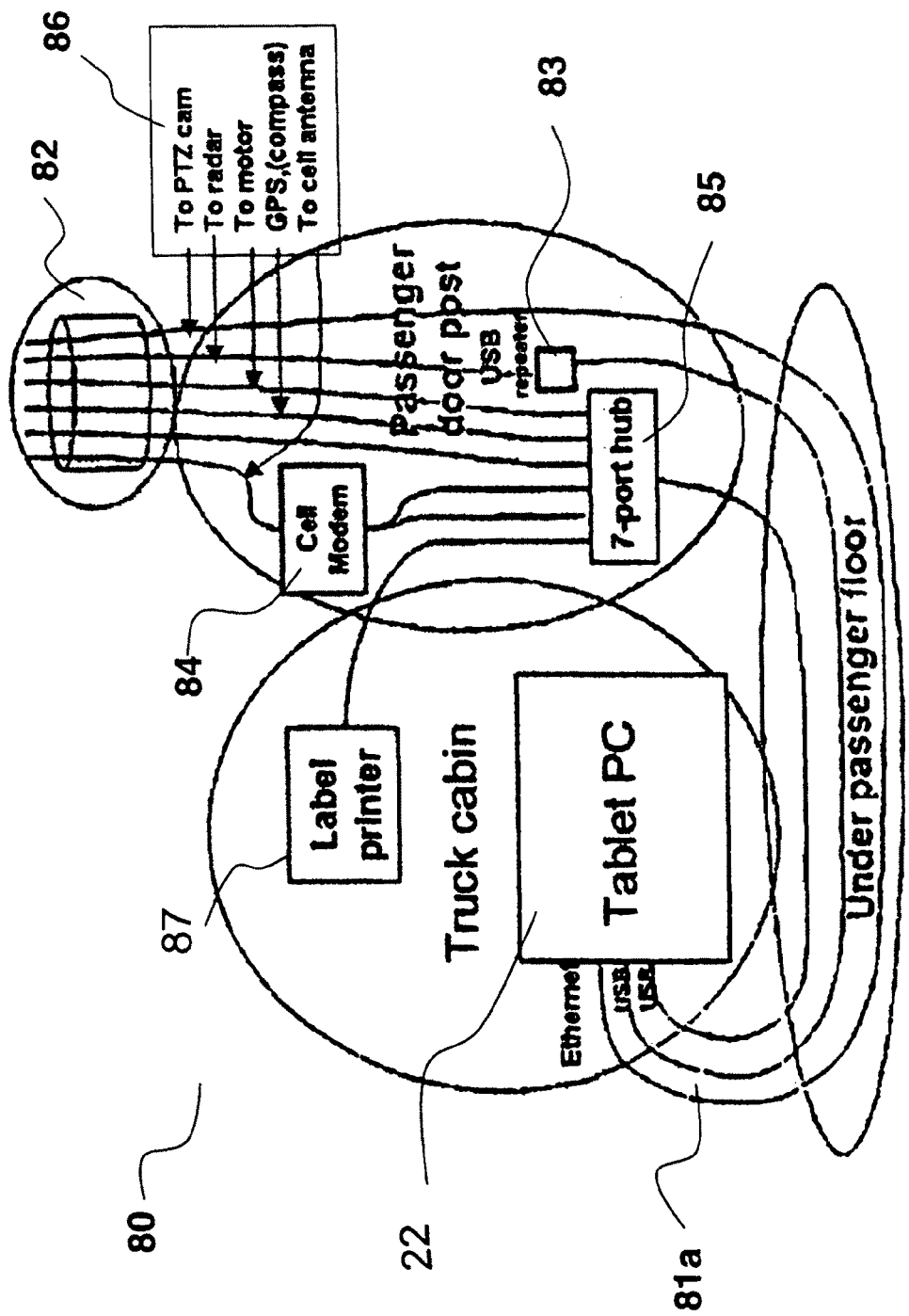
FIG. 7 shows in-cabin components of the FOD system.

This preferred embodiment is a mobile FOD finder 60 which includes a pickup truck vehicle 61 with millimeter wave imaging radar system 62 mounted on top of the cab of the truck as shown in FIGS. 6A and 6B. Radar system 62 communicates with in-cabin equipment through a passage 82 into the cabin as shown in FIG. 7. The antenna assembly is mounted on an electronic turntable which rotates to sweep the radar in azimuth (horizontally) through a specified sweep range. An Intellidrives programmable turntable provides a capability to specify any sweep range or to select continuous rotation. In the preferred embodiment the mechanical scan of the antennas is used for a computer generated horizontal raster image representing 235 angles in an 80 degrees wide horizontal scan direction. The chirp period of the radar is timed with the rotation speed so that the radar executes one full elevation scan as it rotates through one azimuthal beam width.

The radar is protected from weather by a radome 62. The radome is made from thin plastic material such as polystyrene which is almost completely transparent to millimeter waves. A PTZ camera 63 is mounted on the left side of the radome and a wireless communication antenna 64 extends from the top of the radome. The radome size provides sufficient room for the transmit 4 and receive 3 antennas mounted on a turntable 19 to rotate horizontally 360 degrees and collect images within an 80 degrees wide horizontal field of view in any direction selected by the operator. Transmit beam 40b and receive beam 40a of the radar pass through the radome with little attenuation and scan with frequency up and down within a 4 degrees wide vertical field of view 65 as explained above. The vertical field of view is tilted down from the top of the vehicle to the ground and allows imaging of FOD items between 20 and 200 meters range.

GPS/INU

This preferred embodiment incorporates a global position sensor (GPS) unit and an inertial navigation unit (INU), together referred to as a "GPS/INU" assembled on the roof of the truck in the radome compartment. These two components are integrated with the radar through software including a display algorithm which shows the radar operator his location on earth and identifies the direction in which the radar is oriented. The GPS/INU unit is connected to a tablet personal computer (PC) 22 in the cabin via passage 82 and a USB hub 85.

The GPS/INU reports system location to the tablet computer 22 in the cabin. To increase sensitivity and precision of the GPS/INU based measurements, the user initiates system calibration every 1200 hours of use. This calibration is done by maneuvering the vehicle in a full 360° circle. The GPS/INU calibration orients the satellite image loaded via a wireless Internet connection and references vehicle position to this point with an accuracy of about one foot. This correction is kept in the system until another calibration is initiated. The radar sends bearing/range of FOD information to the computer which fuses the data with the vehicle GPS/INU information. The FOD locations produced by the radar are superimposed on the satellite image as red spot icons. This information is ultimately matched to a detection point based on latitude and longitude, the date time group as well as a provided an ID tag all of which is loaded into the database.

External Camera System

This preferred embodiment incorporates a point-tilt-zoom camera enclosed in an all weather enclosure 63. This camera is designed to capture an image of the foreign object debris at the point of discovery. The FOD discovery conditions are imaged, recorded and reported over the Internet via integrated onboard tablet computer 22 and a wireless connection (not shown). The camera is automatically slewed to the detected FOD items as directed by computer 22. As the FOD finder vehicle approaches a FOD item, the camera continues to update images until the FOD is within 20 feet of the driver. The Time, Date, Group and the conditions of the object detection are recorded to the Internet database onboard and by communication to the main database at the airport center using Ethernet wireless connection 81a and modem 64. Time and Date are determined automatically whereas object group and detection conditions are manually selected by the operator from the FOD software menus.

Internal Camera System

A second camera system is mounted in the interior of the FOD finder vehicle. This camera is designed to provide a detailed image of the FOD after its retrieval. This camera is fixed to the computer mounting column and is focused down onto a center console. After an operator retrieves a FOD, it is placed in the center of the console grid marked table. The user selects a "Camera" button which highlights all FOD items detected. The operator then touches the FOD dot that is affiliated with the FOD item being imaged. The selection of the FOD dot initiates the camera and bar code printer. A detailed image of the FOD item is taken by the internal camera and all associated details are sent to a database and the corresponding red dot icon on the satellite image is removed. A printer located inside the vehicle prints a bar code label with the same printed ID that is placed into the database.

User Interface

As explained above the user interface is a tablet computer 22 shown in FIG. 7 with a touch screen. There are a variety of pages and views that provide a user with situational awareness via satellite images of the vehicle location, the areas that have been searched, FOD items that have been detected, radar performance, images of the FOD outside the vehicle, and directions to FOD that have not yet been retrieved. An aerial/satellite image is loaded from Internet into the PC as the primary means to provide horizontal situational awareness. Other interface menus are included which provide the database with additional information to help determine the origin of a specific FOD. The computer is also the central integrator of all other components and systems.

FOD System Operation

Figure 8:
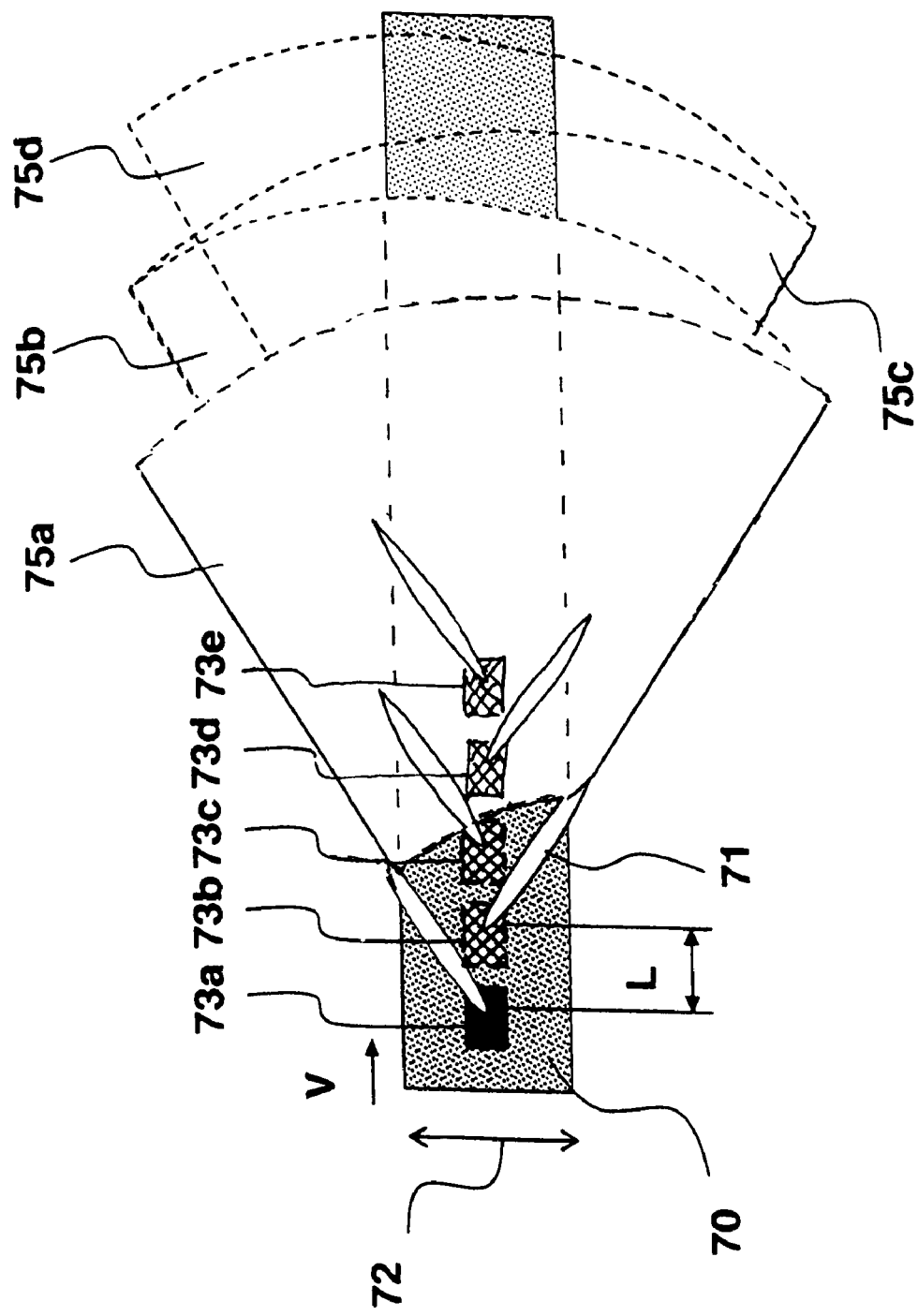
FIG. 8 illustrates operation of the mobile FOD finder radar system on the move along an airport runway.

Operation of the FOD finder radar is illustrated in FIG. 8. Mobile platform 73a travels down any surface of the airport 70 at a speed V. As it covers a distance L an eighty degree scan is accomplished which equates to approximately 600' at 600' from the radar. In the example, the entire width 72 of the runway 70 is swept by the radar beam 71 and an image of an area designated as 75a is created. When the FOD system moves from position 73a to 73b the horizontal beam sweep reverses and the beam sweeps the next area designated as 75b. As the system progresses along the runway from position 73a to 73e, the radar images for areas 75a through 75d are created. At a speed of V=30 miles an hour the radar system will travel a distance of L=20 meters per each 1.5 second horizontal antenna sweep. Due to the 200 meters range of the radar each square foot of the runway will be imaged multiple times which improves reliability of the FOD detection and reduces probability of false alarms. An area imaged by the radar generally extends beyond the boundaries of the runway as indicated in FIG. 8. A detection area limited to the runway can be optionally selected in the display menu of the FOD finder software. Operator can also set up a polygon boundary to manually designate a desired detection area which, for example, will exclude returns from buildings and other permanent fixtures located around the airfield. Due to the wide scanning area of the system, runways can be scanned without the vehicle having to travel on the runway.

To further improve system performance additional designated areas can be defined within a larger detection area representing known permanent structures such as runway centerline lighting. Signals from such structures can be automatically removed or corrected in the image to permit detection of FOD items that may be located close to runway infrastructure objects.

In this preferred embodiment red dot icons in the image represent radar returns exceeding a pre-determined threshold regardless of the item size and signal level above the threshold. Each icon is placed sequentially based on time of detection and all are numbered sequentially in the database as they are placed at the detected locations on the overhead view satellite map. Only returns confirmed by multiple sweeps are displayed. At the time of initial detection, a voice warning alerts the driver that FOD has been detected. As the vehicle approaches the FOD, another voice warning is initiated at 20' from the FOD which tells the operator they are approaching FOD. The audible system allows the driver to operate the vehicle safely without having to reference the touch screen constantly.

The latitude, longitude, time of detection, the person who detected the object, the airfield location, the date and multiple images of the detected item are collected and stored in an onboard database. FOD item coordinates and time of detection are automatically determined by the PC using GPS/INU and system clock. Operator name is also automatically determined from the system operator shift schedule stored in PC memory or from the Internet. FOD images are collected using external and internal cameras as described above. At the conclusion of the collection, all the data is synchronized with an Internet database via a wireless link.

In the event a FOD item is spotted without the FOD finder detecting it or something blowing on the runway after the radar sweep has gone past the area, the user can manually place a red FOD dot on the screen. The system then logs all the details for the current vehicle location. The rest of the process is identical to the radar detected FOD.

In the event that a FOD detection should be rejected (bird/wildlife/aircraft/person) item moves or it cannot be picked up, the operator selects "Reject", but the data remains in the database. An example would be a bird that lands on a runway, is detected and then flies away. This would be logged as reject due to animal movement.

The FOD finder runs on an "Air Boss" software system created by the Applicants. This software turns all FAA Part 139 checklist items for airfield management into a simple to use menu system with standardized responses for entry. It reduces the amount of typing/note taking to a minimum by creating standardized response checklists based on the limited amount of variables to each item. For example, if a taxiway light is burnt out, then user would touch the Air Boss logo and the 11 airfield management areas would appear on the screen. The Operator then chooses "Lighting" and a six lighting sub areas appear on the bottom right of the screen. The operator would pick "Runway lighting out" and touch the appropriate light on the satellite image. The Runway light out symbol would then appear on the screen in that location and all location and time details are sent to the database. In addition, an email, text or phone message work order is sent to the appropriate repair agency. All actions from discover to repair is tracked on the database and meets the FAA requirements for documentation of airfield management.

The Air Boss software also includes information from the Internet which is combined to provide situational awareness to the operator. This information includes the flow of aircraft to and from the airport, aircraft details, gate information, flight status, airfield status, weather, NOTAMS and other pertinent information essential for the management of the airfield operations and available via multiple commercial and government databases.

The Air Boss software also assists in preventing runway incursions. As the vehicle approaches areas of the airport that are off limits or require coordination with a controlling agency, the software alerts the driver audibly with a voice warning and instructions to contact the controlling agency and visibly by placing a stop sign on the touch screen with written instructions to contact the controlling agency. All features of the FOD Finder are disabled until the driver touches the stop sign acknowledging the instructions. All of the driver actions are recorded in the database. The FOD Finder also images the surface of the runway/taxiways for management of its condition. It can detect cracks, holes and other key part 139 details for surface management. The data from all the databases is provided to the users on a regular basis for analysis, prevention and maintenance in a number of airfield areas.

System Power Management

The FOD finder components are powered from a 12VDC vehicle system. A DC to AC power converter changes the voltage to 120 VAC which is used to support various types of equipment.

Other Applications of the FOD Radar

The FOD radar can also be used for runway edge detection and identifying equipment on surfaces during low visibility situations. It can be used in rescue, emergency operations and to help aircrafts find their way off the runway through the "FOLLOW ME" procedures.

Recent FOD Finder Modification

Applicants' current preferred embodiments include the following additional features as compared to earlier versions.
Eight High-Definition Cameras
Eight high-definition cameras have been added to the FOD Finder system providing a 360 degree view around the vehicle. This can be used as a digital recording of events or as a live feed. It was created because the Airport director at O'Hare has an office below ground and can never see what is happening on the airport surface. So these cameras allow him a live feed to see how his team is responding to various events
Debris Removal System
Applicants have integrated a physical retrieval device including a scoop and a vacuum system. The physical retrieval device is designed to pick up types of debris from wire to tires. It includes a scoop device that has a mouth approximately as wide as the vehicle for scooping up small and large items. Some items will be too difficult for a vacuum to pull up so Applicants just scrape it off the surface and catch it in a netting for later removal. The vacuum system is located behind the physical removal system and vacuums up small debris items that are missed by the physical scoop as well as sucks debris from any grooved surfaces the scoop cannot clean. The entire section is integrated so that debris is continually vacuumed away from scoop area.
Remote Camera Capability
Applicants have added a portable camera. The operator can use the camera to take pictures away from the vehicle or in awkward places and then as the operator moves the camera near the Air Boss user interface, the camera makes a Bluetooth link to the Air Boss and places the pictures just taken on the Air Boss screen. The user then selects the photo (by touch it on screen) and assigning it to a FOD item or discrepancy and it is melded into the database and report produced by system.
False Target Rejection Software
Applicants have added false target rejection software into the system for operating in high traffic environments. With this software the computer system remembers images that represent false targets and automatically eliminates these images from monitor screens.
Runway Light Checks
Applicants are adding new software that will detect and identify defective runway lights. The cameras of the FOD finder vehicle images runway lights. These images are correlated with the GPS unit on the vehicle and the software makes a record of which lights are working and which lights are not working. If not operating, they will report automatically to the AIR Boss system. This system works by looking for light at specific known locations during night time operations.

While the above description contains many specificities, the reader should not construe these as limitations on the scope of the invention, but merely as exemplifications of preferred embodiments thereof. Those skilled in the art will envision many other possible variations within its scope. For example in addition to the preferred embodiment described in the main text of this application, the Applicants also envision future alterations of the design to reduce cost and/or increase range and/or performance of the radar FOD detection system.

Polarization Agility

Antenna polarization agility can be introduced in the form of a rotating cylinder inside of the FOD Finder radome with quarter-wave polarization rotating plates comprising two overlapping half-cylinders at the heights of the receive and transmit antennas respectively. Using a motor or other means to select the orientation of this cylinder relative to the FOD Finder viewing direction, the operator can select to transmit and receive vertical polarization (the current default), transmit vertical and receive horizontal, transmit and receive horizontal, or transmit horizontal and receive vertical polarization. Other antenna types, for instance patch arrays, can also be used in conjunction with varactors or ferrite elements to affect polarization characteristics more rapidly. The theory for using polarization characteristics of radar return to aid in the detection and characterization of small targets is well known.

Phased Array Receiver

Applicant has demonstrated a variant of the FOD Finder Radar in which the receive antenna and radio receiver were implemented in the form of a multi-element phased array. In this embodiment, the need for mechanical scanning in azimuth is obviated by the ability of a beam-forming processor to simultaneously record and process returns from all azimuth positions without rotating the phased array antenna. At present, cost considerations preclude adoption of such a system architecture, but millimeter-wave component pricing trends project to an affordable phased array solution within 5 years. Applicants' employer has patented an alternate version of the phased array antenna, U.S. Pat. No. 6,037,908, for which a built-in beam forming processor incorporates a translatable output horn which sequentially samples azimuth beams to sweep the radar's azimuth pattern without changing the antenna's orientation. This latter antenna eliminates the need for a mechanical rotation stage, without the added cost of a multichannel phased array receiver.

Wider Frequency-Scan Field of View

Adoption of a serpentine antenna slot array can be used to increase the elevation field of view of the FOD Finder beyond its current limit of 4 degrees. Alternatively, any of a number of multi-focusing techniques, including bending antenna slot arrays or reflectors in the current geometry, or adopting a center-fed slot array, can act to increase elevation field of view.

Combined Transmit/Receive Antennas

In order to reduce FOD Finder footprint and cost, it may become desirable to combine the transmit and receive functions into a single antenna. Use of a directional coupler or isolator, or an active phase-cancellation technique at the antenna output, in conjunction with a high-pass filter to remove baseband direct current, can allow for the elimination of one of the two cylindrical elliptical antennas currently used in the FOD Finder radar.

Accordingly, the reader is requested to determine the scope of the invention by the appended claims and their legal equivalents, and not by the examples which have been given.

What is claimed is:

1. A short range millimeter wave imaging radar system comprising:
   A) a frequency scanned millimeter wave surface imaging radar system mounted on the vehicle, said radar system comprising:
      1) electronics adapted to produce millimeter wave radiation scanned over a frequency range of a few gigahertz,
      2) a frequency scanned transmit antenna adapted:
         a) to produce a narrow scanned transmit beam in a first scanned direction defining a narrow approximately one dimensional electronically scanned field of view corresponding to the scanned millimeter wave frequencies, and
         b) to be mechanically pivoted or scanned in a second direction perpendicular to the first scanned direction so as to define a two-dimensional field of view of a surface region,
      3) a frequency scanned receive antenna co-located or approximately co-located with said transmit antenna and adapted to produce a narrow scanned receive beam in a first scanned direction defining a narrow approximately one dimensional electronically scanned field of view approximately co-directed in the same directions as the transmitted beam in approximately the same one dimensional and two dimensional fields of view as the transmit antenna,
      4) electronics adapted to detect millimeter wave radiation collected by the frequency scanned receive antenna, and
      5) computer processor equipment adapted determine location of targets located on the surface region based on millimeter wave radiation reflected from the targets and collected by said receive antenna.

2. The imaging radar system as in claim 1 wherein the system is stationary and adapted to continuously or periodically monitor a particular surface region.

3. The imaging radar system as in claim 1 wherein the system is mounted on a vehicle and adapted for mobile imaging.

4. The imaging radar system as in claim 3 and further comprising a positioning system for monitoring the global position of the vehicle.

5. The imaging radar system as in claim 4 wherein the positioning system is a GPS system.

6. The imaging radar system as in claim 1 wherein said system is adapted to image FOD on airport surfaces.

7. The imaging radar system as in claim 1 wherein said system is adapted to image FOD on airport runways.

8. The imaging radar system as in claim 1 wherein said first scanned direction is a vertical direction and said second scanned direction is an azimuthal direction.

9. The imaging radar system as in claim 1 wherein each of said transmit antenna and said receive antenna comprises a slotted antenna and a elliptical cylinder reflector and is adapted to operate in a operating frequency range chosen from a millimeter wave frequency between 57 GHz and 100 GHz.

10. The imaging radar system as in claim 9 wherein the operating frequency range includes a frequency range of 78 GHz to 81 GHz.

11. The imaging radar system as in claim 1 wherein said electronics includes;

A) a phase-locked oscillator operating at a pre-selected narrow band microwave frequency,
B) frequency multiplying components for multiplying this pre-selected narrow band microwave frequency to a narrow band millimeter wave frequency,
C) voltage controlled scanning components for generating a voltage controlled scanned frequencies scanning a frequency range of a few gigahertz, and
D) mixing components for mixing said voltage controlled scanned frequencies with said narrow band millimeter wave frequency to produce said millimeter wave radiation scanned over a frequency range of a few gigahertz.

12. The imaging radar system as in claim 1 and further comprising a radio system adapted for communication with the Internet.

13. The imaging radar system as in claim 4 wherein said computer processor equipment comprises:
A) a display monitor adapted to display satellite surface maps of a surface area including the two-dimensional field of view in front of the vehicle
B) GPS/INU components and software for determining the latitude and longitude of positions of targets in the two-dimensional fields of view.

14. The imaging radar system as in claim 4 wherein said computer processor equipment comprises:
A) a display monitor adapted to display satellite surface maps of a surface area including the two-dimensional field of view in front of the vehicle
B) GPS/INU components and software for determining the latitude and longitude of positions of FOD targets in the two-dimensional fields of view,
C) Secure web database for multiple users and
D) Allows global FOD data sharing.

15. The imaging radar system as in claim 1 wherein the radar system is a phased array radar system incorporating a translatable output horn.

* * * * *